United States Patent
Okajima (10) Patent No.: US 6,975,565 B1
(45) Date of Patent: Dec. 13, 2005

(54) DISK APPARATUS

(75) Inventor: Tadashi Okajima, Yao (JP)

(73) Assignee: Sanyo Electric Co., Ltd., Osaka (JP)

( * ) Notice: Subject to any disclaimer, the term of this patent is extended or adjusted under 35 U.S.C. 154(b) by 560 days.

(21) Appl. No.: 09/650,757

(22) Filed: Aug. 30, 2000

(30) Foreign Application Priority Data

Sep. 3, 1999 (JP) .................................. 11-250525

(51) Int. Cl.⁷ ............................................. G11B 7/00
(52) U.S. Cl. ................................ 369/44.28; 369/53.28
(58) Field of Search .......................... 369/44.11, 44.14, 369/44.25, 44.28, 44.29, 44.32, 47.14, 53.12, 369/53.15, 53.23, 53.28

(56) References Cited

U.S. PATENT DOCUMENTS

| | | | | |
|---|---|---|---|---|
| 4,866,687 A | * | 9/1989 | Kasai et al. | 369/30.15 |
| 4,924,483 A | | 5/1990 | Cho | 377/3 |
| 4,974,220 A | | 11/1990 | Harada | 369/44.26 |
| 5,351,222 A | * | 9/1994 | Ikeda et al. | 369/30.17 |
| 5,457,671 A | * | 10/1995 | Takata et al. | 369/44.28 |
| 5,844,871 A | | 12/1998 | Maezawa | 369/44.28 |
| 5,901,120 A | | 5/1999 | Matsui | 369/44.28 |
| 6,067,280 A | * | 5/2000 | Ma | 369/44.28 |
| 6,314,066 B1 | * | 11/2001 | Hong et al. | 369/44.28 |
| 6,377,523 B2 | * | 4/2002 | Yanagi | 369/44.28 |

FOREIGN PATENT DOCUMENTS

| | | | | |
|---|---|---|---|---|
| JP | 5-325209 | 12/1993 | | |
| JP | 8-339547 | 12/1996 | | |
| JP | 9-167359 | 6/1997 | | |
| JP | 09288829 A | * 11/1997 | ........... | G11B 7/085 |
| JP | 11-73650 | 3/1999 | | |

* cited by examiner

Primary Examiner—William Korzuch
Assistant Examiner—Bach Vuong
(74) Attorney, Agent, or Firm—Westerman, Hattori, Daniels & Adrian, LLP (57) ABSTRACT

A disk apparatus includes a DSP core. If given an instruction to skip music during reproducing with an MO disk, the DSP core sets to a counter a count value corresponding to the number of tracks to jump over. Then, tracking servo is turned off and an optical pickup is moved in a radial direction of the MO disk. The DSP core detects rising and trailing edges in a TZC signal and counts down the counter. When the count value becomes 1, a level of the TZC signal is determined to judge whether there is variation in offset value or not. If there is variation in offset value, edges are considered counted incorrect. Accordingly, the count value is incremented. Thus, jump can be made to a desired land or groove, i.e. access can be made positively to a target position.

6 Claims, 8 Drawing Sheets

(A) TE SIGNAL (B) TZC SIGNAL (C) DISK SECTION (D) TZC SIGNAL DEVIATION

PRESENT POSITION          TARGET POSITION

DISK APPARATUS

BACKGROUND OF THE INVENTION

1. Field of the Invention

This invention relates generally to disk apparatuses and, more particularly, to a disk apparatus for setting to a counter a count value corresponding to the number of tracks to jump over, subtracting the count value each time a rising or trailing edge is detected in the zero-cross signal, and applying brake to finish jump when the count value reaches 0.

2. Description of the Prior Art

In the conventional disk apparatus of this kind, when seek is instructed, a count value is set to a counter correspondingly to the number of tracks to jump over. When the optical pickup is moved in a radial direction of the disk, counting is made on rising and trailing edges of a zero-cross (TZC) signal switching between high and low levels at zero-cross points of a tracking error (TE) signal. If the remaining count value reaches 1, a brake pulse is outputted to decelerate the optical pickup and turn on tracking servo. In this manner, the optical pickup is jumped from a track including a current position over to a desired track, thus seeking a target position.

Figure 8:
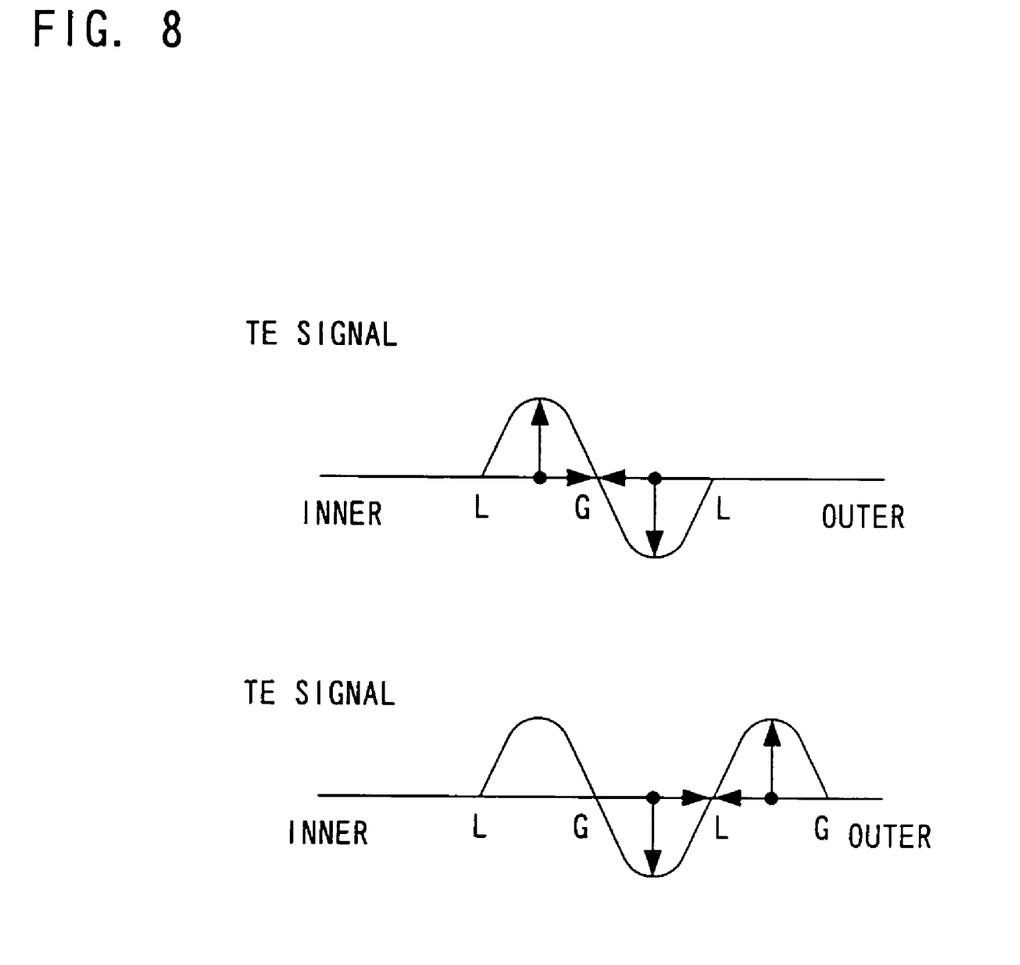
FIG. 8 is an illustrative view showing a polarity of a tracking error signal and output to a tracking actuator upon tracking on using an ASMO disk on a prior-art disk apparatus.

Meanwhile, where using an ASMO (Advanced-Storage Magnet-Optical) disk capable of land/groove-recording, the output polarity to a tracking actuator for tracking on is different in polarity between land and groove. That is, as shown in FIG. 8, for tracking on a groove, the tracking error signal is same in polarity as the output to the tracking actuator. However, where a land is to be tracked on, the polarity is reversed. Incidentally, in FIG. 8, the output to the tracking actuator is illustrated in parallel with the horizontal axis, wherein the polarity of the output to the tracking actuator is taken positive in a direction toward an outer periphery of the disk and negative in a direction toward an inner periphery thereof. Consequently, it is a conventional practice to differ the polarity in the output to the tracking actuator depending upon a land or a groove to be tracked on.

However, if the TZC signal in its offset value varies during seek, disturbance possibly occurs in the TZC signal, resulting in incorrect counting of TZC signal edges. For example, where jumping to a land, if a TZC signal edge is miscounted, tracking on would be toward a groove. That is, the output to the tracking actuator is made reverse in polarity upon effecting tracking. This might unsuccessfully introduce a track, leading to overrun of the optical pickup, i.e. unstable seek.

SUMMARY OF THE INVENTION

Therefore, it is a primary object of the present invention to provide a disk apparatus which can implement seek with stability.

The present invention is a disk apparatus for setting to a counter a count value corresponding to the number of tracks to jump over, subtracting the count value each time a rising or trailing edge is detected in a zero-cross signal, and applying brake to finish jump when the count value reaches 0, comprising: level determining means for determining a level of the zero-cross signal; and adding means for incrementing the count value depending upon the level.

In the disk apparatus, if for example an instruction for seek is given, a count value is set to the counter as a down-counter correspondingly to the number of tracks to jump over. When the pickup is started to move in the radial direction of the disk, a tracking error signal (TE signal) is extracted that occur upon crossing a track. A zero-cross signal (TZC signal) is produced that is switched at zero-cross point between high and low levels of the TE signal. Counted are rising and trailing edges of the TZC signal, i.e. counted are lands and grooves existing between a present position and a target position. Meanwhile, a level of the TZC signal is determined, depending on which level the count value is incremented. That is, in the event that edges are miscounted due to variation in TZC-signal offset value, the count value is incremented thus enabling jump positively to a desired land or groove.

According to the invention, even if incorrectly counting the number of TZC signal edges, jump is accurately effected to a land or groove. Thus, a target position is positively accessed, i.e. seek is effected with stability.

In one aspect of the invention, track determining means determines to which one jump is to be made of a land or a groove. Specifically, a track including a present position is determined whether at a land or a groove, thereby determining whether jump is to be made to a land or a groove. That is, determination is made whether to a land or a groove, and further determination is made whether there is variation in offset depending on a level of the TZC signal. Accordingly, jump can be effected correctly to a land or groove.

In one embodiment of the invention, direction determining means determines in which one of an outward direction or an inward direction of a disk a pickup is to move disk. Thus, jump can be effected with higher accurately.

That is, where the pickup is moving toward an outer periphery of the disk, when a land is determined and the level of the TZC signal is in a low level or when a groove is determined and the level of the TZC signal is in a high level, it is determined that the number of edges is miscounted. Accordingly, the count value is incremented. Due to this, a brake pulse can be supplied in desired timing to turn on tracking servo. Thus, jump can be effected correctly to a land or groove.

Meanwhile, where the pickup is moving toward an inner periphery of the disk, when a land is determined and the level of the TZC signal is in a high level or when a groove is determined and the level of the TZC signal is in a low level, it is determined that the number of edges is miscounted. Accordingly, the count value is incremented. Due to this, a brake pulse can be supplied in desired timing to turn on tracking servo. Thus, jump can be effected correctly to a land or groove.

In another aspect of the invention, the level determining means determines the level when the count value reaches a predetermined value. Specifically, because a level is determined when counting an edge immediately before outputting a brake pulse, even if edges are miscounted, the count value can be corrected. Accordingly, jump can be effected accurately to a land/groove.

In still another aspect of the invention, the level determining means determines the level prior to setting the count value and starting jump. Consequently, because the count value can be corrected previously, there is no possibility of miscounting edges. That is, jump can be effected accurately to a land/groove.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
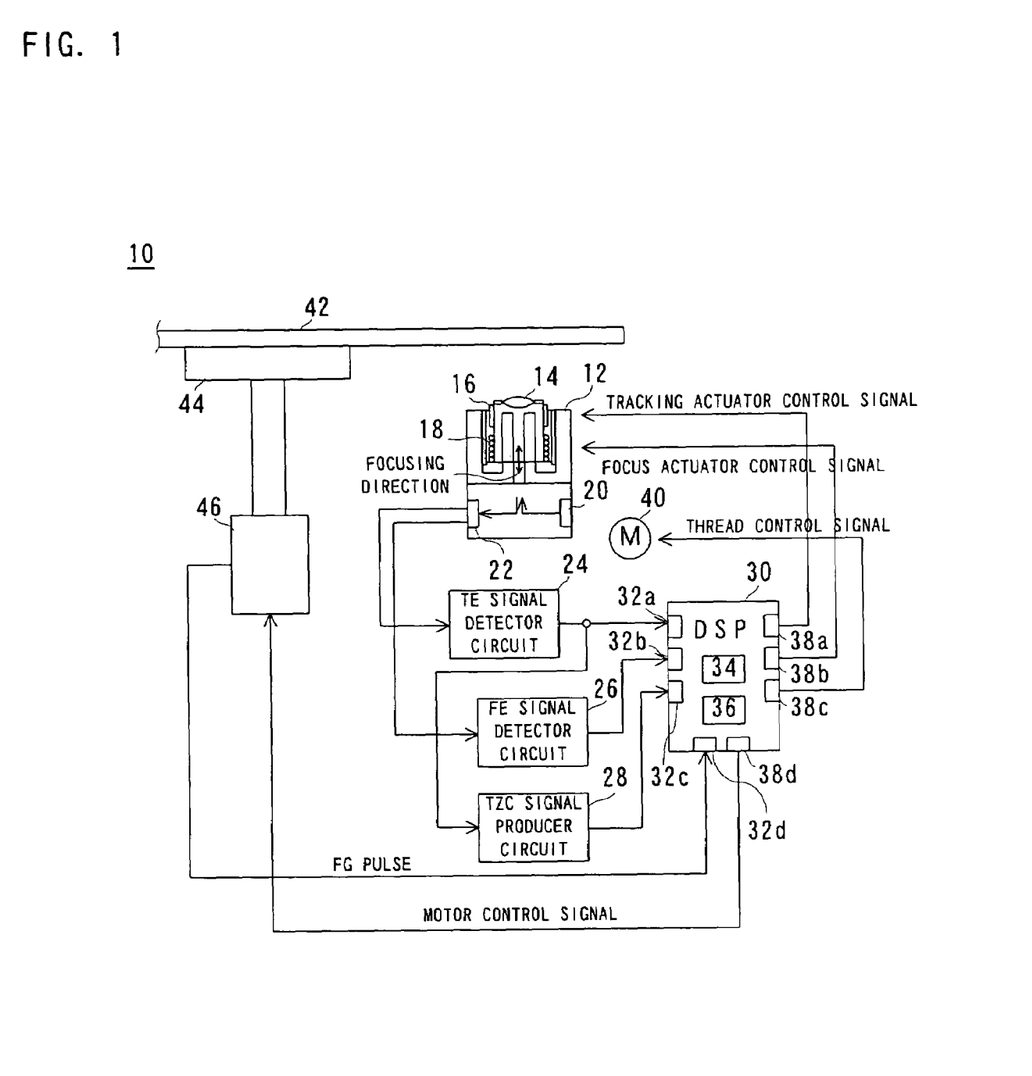
FIG. 1 is an illustrative view showing one embodiment of the present invention.

Referring to FIG. 1, a disk apparatus 10 of this embodiment includes an optical pickup 12. The optical pickup 12 includes an optical lens (objective lens) 14. The objective lens 14 is supported by a tracking actuator 16 and a focus actuator 18. Consequently, the laser light emitted from a laser diode 20 is converged by the objective lens 14 and illuminated to a reproducing surface of a magnet-optical disk (ASMO disk) 42. This enables to read a desired signal out of the ASMO disk (hereafter, merely referred to as "MO disk") 42. Incidentally, the MO disk 42 is a disk capable of lands/groove-recording. Also, the optical pickup 12 is coupled to a thread motor 40, for example, through a lack-and-pinion scheme, and hence can be moved in a radial direction of the MO disk 42.

The laser light reflected upon a disk surface passes through the same objective lens 14 and illuminated to a photodetector 22. The photodetector 22 has an output to be inputted to a TE signal detecting circuit 24 and FE signal detecting circuit 26 where a TE signal (tracking error signal) and an FE signal (focus error signal) are respectively detected. The detected TE and FE signals are respectively supplied to A/D converters 32a and 32b provided in a DSP (Digital Signal Processor) 30.

Figure 2:
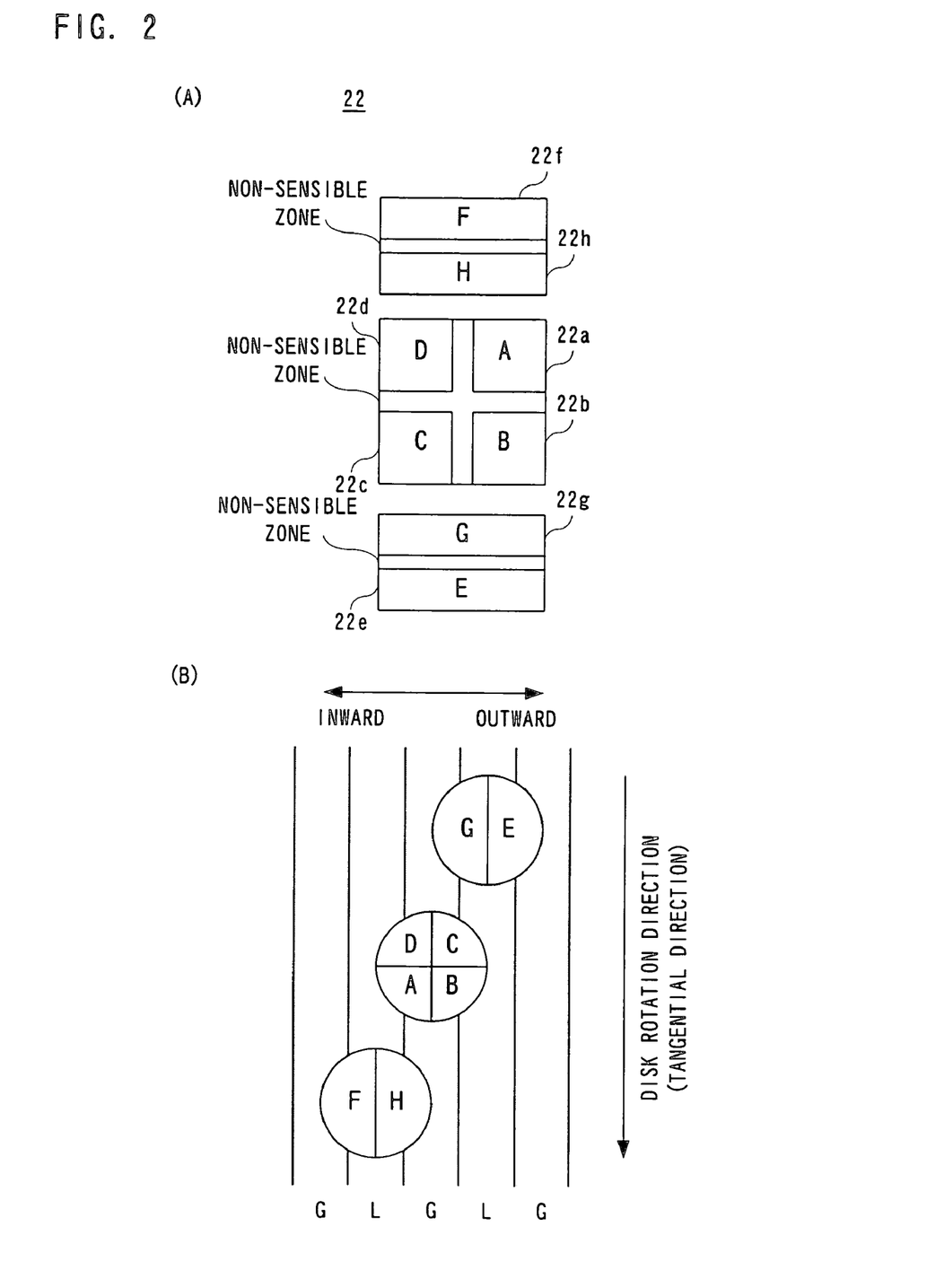
FIG. 2(A) is an illustrative view showing a photodetector and FIG. 2(B) is an illustrative view showing laser light (spot light) illuminated to the track.

Explaining in greater detail, the photodetector 22 is to be illustrated by FIG. 2(A). The photodetector 22 has four regions A–D provided at a center, and regions F, H and regions G, E provided at the upper and lower thereof. The regions A–H are respectively formed by photodetector elements 22a–22h. That is, the laser light emitted from the laser diode 20 is diffracted through a not-shown diffraction grating so that three of spot light can be illuminated through the objective lens 14 to the reproducing surface of the MO disk 42. Specifically, as shown in FIG. 2(B), the spot light corresponding to the regions F and H and that corresponding to the regions G and E are illuminated to the left and right of the spot light corresponding to the regions A–D as a center, with respect to a rotation direction (tangential direction) of the MO disk. Incidentally, a reproduced signal is extracted by the spot light corresponding to the regions A–D. Also, in FIG. 2(B) a grayed zone refers to a groove (G) and a whited zone to a land (L).

The light components reflected upon the reproducing surface of the MO disk 42 is inputted to the respective photodetector elements 22a–22h. The photodetector elements 22a–22h have outputs to be inputted to the TE signal detector circuit 24 while the photodetectors 22a–22d have outputs to be inputted to the FE signal detector circuit 26. These circuits perform different operations. Consequently, the TE signal detector circuit 24 outputs a TE signal as given by Equation 1, and the FE signal detector circuit 26 outputs an FE signal as given by Equation 2. Note that, in Equations 1 and 2, the outputs of the photodetectors 22a–22h are denoted by the same characters as those of the regions A–H.

$$TE = \{(A+D)-(B+C)\} - \alpha\{(F+G)-(E+H)\} \quad \text{[Equation 1]}$$

where $\alpha \approx 2$.

$$FE = (A+C)-(B+C) \quad \text{[Equation 2]}$$

Meanwhile, the TE signal outputted from the TE signal detector circuit 24 is inputted to the tracking zero-cross (TZC) signal producer circuit 28. The TZC signal producer circuit 28 produces a TZC signal switching between high (H) and low (L) levels at each zero-crossing of the input TE signal. The produced TZC signal is supplied to an A/D converter 32c. Incidentally, the DSP 30 enables an output of the A/D converter 32c only when seek is effected.

Furthermore, the MO disk 42 is rested on the turntable 44 in a fixed manner and hence rotated together with the turntable 44 by a spindle motor 46. The spindle motor 46 generates an r.p.m.-related FG pulse. This FG pulse is supplied to an A/D converter 32d of the DSP 30. Incidentally, the MO disk 42 is a disk of a constant-linear-velocity (CLV) scheme, and the spindle motor 46 decreases in r.p.m. as the optical pickup 12 moves toward an outer periphery of the disk.

The TE and FE, TZC and FG signals thus supplied to the A/D converters 32a–32d are converted into digital signals and then inputted to the DSP core 36. The DSP core 36 performs tracking-servo processing based on the TE signal, focus-servo processing based on the FE signal and spindle-servo processing based on the FG signal.

The tracking-servo processing produces a tracking actuator control signal and a thread control signal, thereby outputting corresponding PWM signals from the PWM drivers 38a and 38c to the tracking actuator 16 and the thread motor 40. Also, the focus-servo processing produces a focus actuator control signal, thereby outputting a corresponding PWM signal from a PWM driver 38b to a focus actuator 18. Furthermore, the spindle-servo processing produces a spindle servo motor control signal, thereby outputting a corresponding PWM signal from a PWM driver 38d to the spindle motor 46.

In this manner, a tracking-servo system is formed by the TE signal detector circuit 24, the DSP 30, the tracking actuator 16 and the thread motor 40. Due to this, the objective lens 14 is properly controlled of tracking based upon the TE signal. Also, a focus-servo system is formed by the FE signal detector circuit 26, the DSP 30 and the focus actuator 18. Due to this, the objective lens 14 can be properly controlled of focussing based on the FE signal. Furthermore, a spindle-servo system is formed by the spindle motor 46 and the DSP 30. Thus, the spindle motor 46, and hence the MO disk 42, can be properly controlled of rotation based upon the FG signal. As a result, the laser light outputted from the laser diode 20 is illuminated with desired light quantity onto a desired track (not shown). Thus, a desired signal is to be read out of the disk surface.

Figure 3:
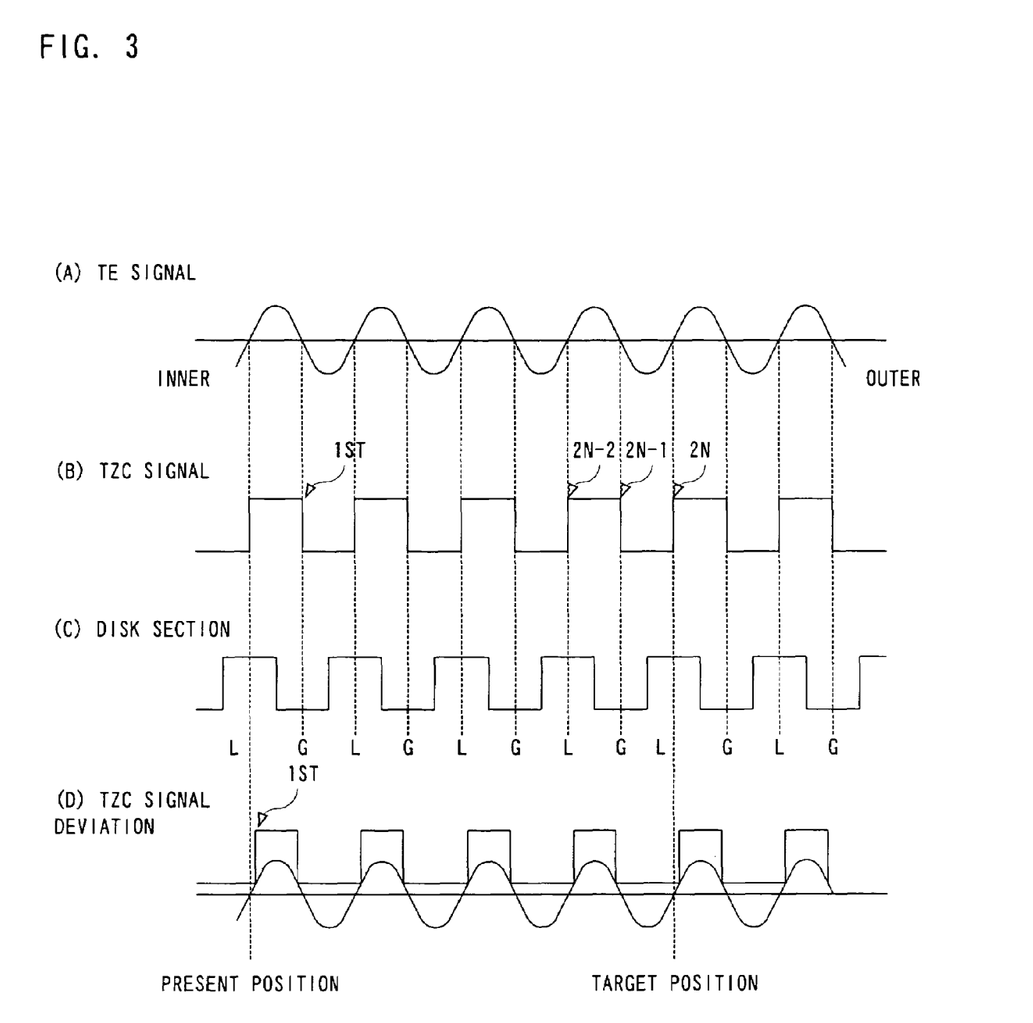
FIG. 3(A) is an illustrative view showing a TE signal during seek.
FIG. 3(B) is an illustrative view showing a TZC signal produced based on the TE signal.
FIG. 3(C) is an illustrative view showing one part of a corresponding section of an MO disk to the TE and TZC signals.
FIG. 3(D) is an illustrative view showing a case that the TZC signal deviates due to affection of noise, etc.

For example, if an instruction of seek, such as for music skipping, is provided from a host computer (not shown) during reproducing a desired signal recorded on the lands, i.e. given a land count of between a present position as represented in FIG. 3 and a target position, then tracking servo is turned off according to an instruction by the DSP core 36 and a kick pulse (PWM signal) proportional to a count of tracks to jump over (rising and trailing edges of the TZC signal counted) is delivered to the thread motor 40.

Incidentally, if during reproducing from the grooves, the number of grooves of between a present position and a target position is provided to the DSP core 36. Note that, in FIG. 3, the leftward in the figure represents an inner side of the MO disk 42 and the rightward thereof is an outer side of the MO disk 42.

When the count value becomes 0, a brake pulse (PWM signal) is supplied to the thread motor to subsequently turning on tracking servo. Thus, the optical pickup 12 is allowed to access a target position.

Incidentally, the count value is set in consideration of the number of edges to be detected after applying brake and before stopping of the optical pickup 12.

However, if the TZC signal producer circuit 28 varies in its offset value, disturbance occurs in the TZC signal as shown in FIG. 3(D). Due to this, a first edge is to be miscounted as can be seen from comparison with FIG. 3(B). This possibly results in tracking on a groove and hence overrun of the optical pickup 12. In order to avoid this, the present embodiment carries out processing as given below.

Figure 4:
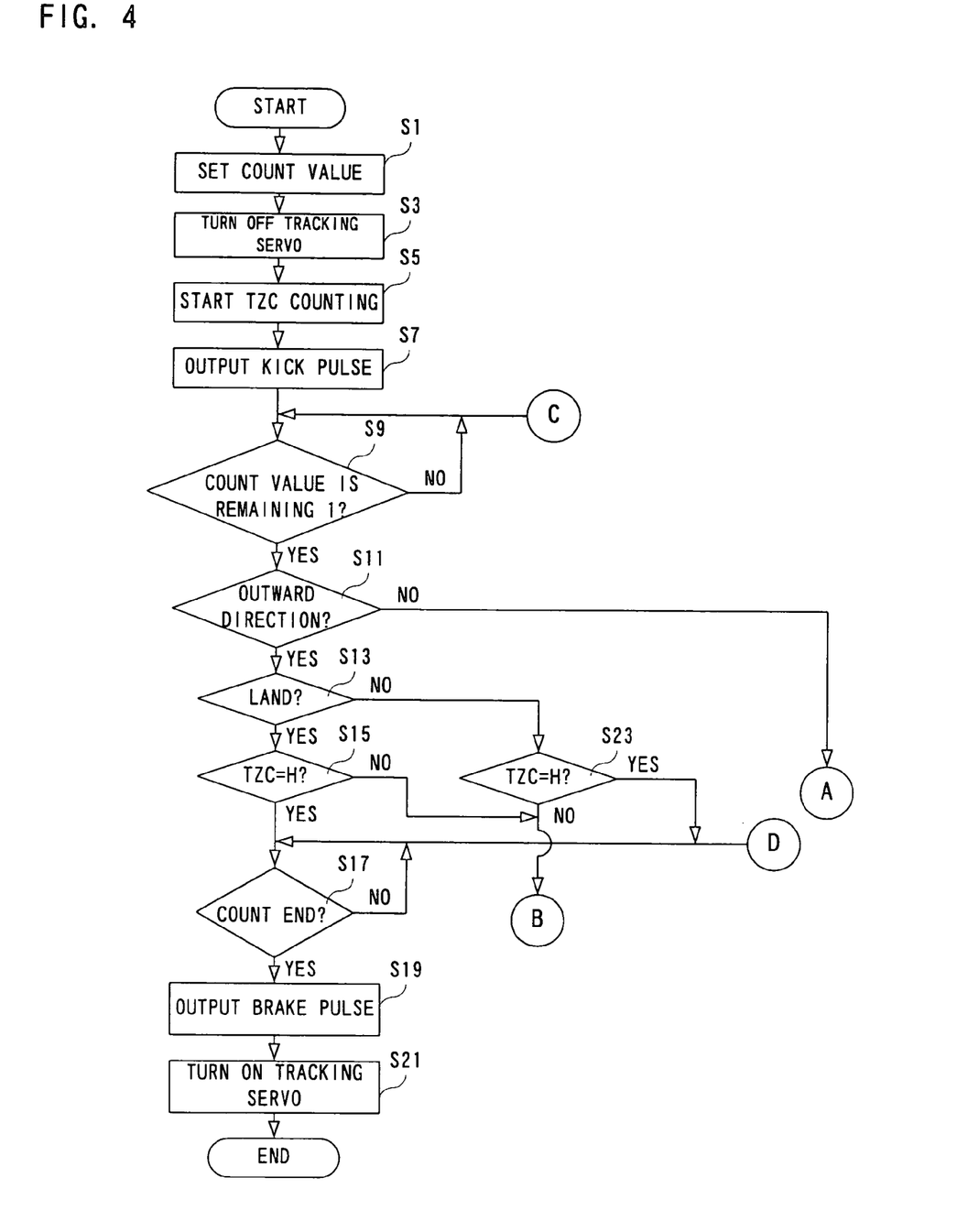
FIG. 4 is a flowchart showing one part of processing by a DSP core shown in the FIG. 1 embodiment.
Figure 5:
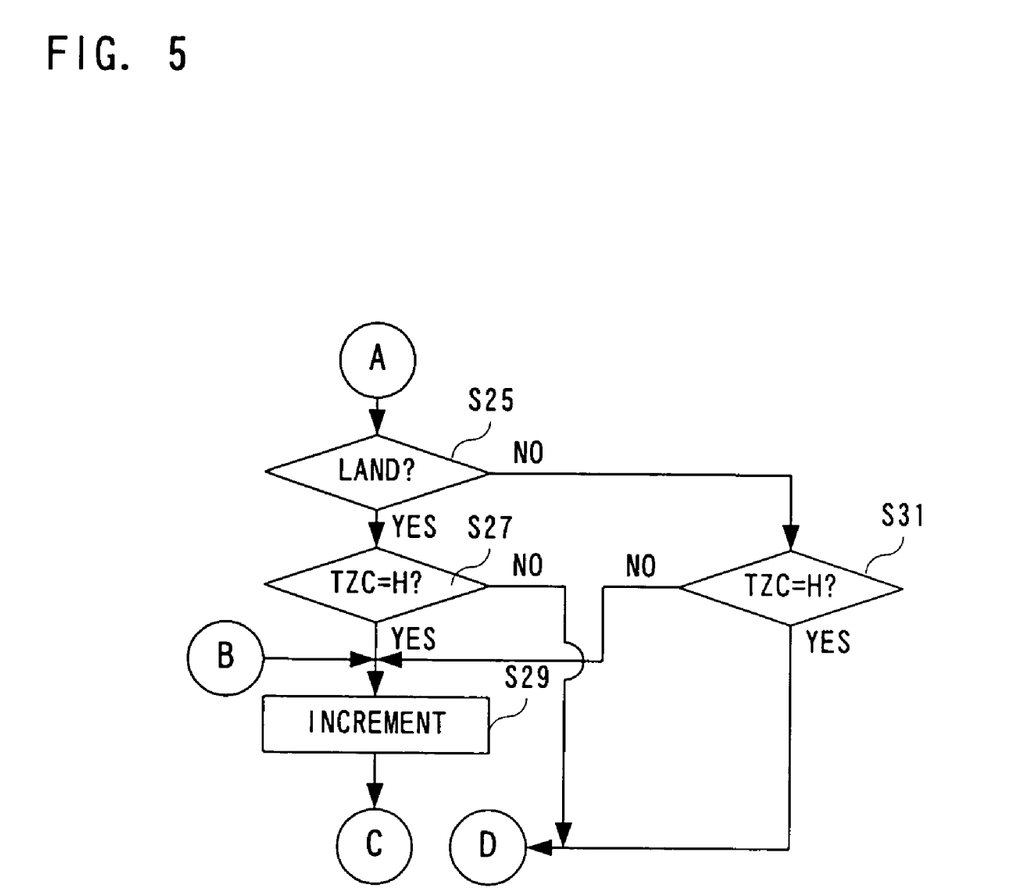
FIG. 5 is a flowchart showing another part of processing by the DSP core shown in the FIG. 1 embodiment.

That is, the DSP core 36 processes a flowchart shown in FIG. 4 and FIG. 5. Incidentally, the DSP core 36 in actual has logic for carrying out the below processing. Explanation is made using the flowchart for the convenience of explanation. Given an instruction of seek, the DSP core 36 starts processing. In step S1, the number of TZC signal edges (2N−1) to be counted, i.e. a count value, is set to a counter 34 based on the number of lands or grooves (N) to jump over as instructed by the host computer.

Incidentally, the host computer calculates the number of lands or grooves to jump over (N) based on a present position address and a target position address. Although the number of TZC-signal rising and trailing edges up to a target position is 2N, there is a need of applying brake at one before that. Accordingly, 2N−1 is set to the counter 34.

In the following step S3, the tracking servo is put off. In step S5 is started counting of TZC signal edges. That is, the counter 34 serving as a down-counter is enabled. Next, in step S7 a kick pulse proportional to the number of tracks to jump over is outputted from the PWM driver 38c to the thread motor 40. Due to this, the optical pickup 12 is moved in a radial direction (outward or inward) of the MO disk 42 by the thread motor 40. During movement of the optical pickup 12, the reflected light upon the reproducing surface of the MO disk 42 is detected by the photodetector 22. Thus, a TE signal as shown in FIG. 3(A) is acquired based on an output signal given from the photodetector 22. Based upon the TE signal, the TZC signal producer circuit 28 produces ZC signal as shown in FIG. 3(B).

The DSP core 36 detects edges of the TZC signal, i.e. switching of from high level to low level or low level to high level. As can be seen from one part of the MO disk 42 section shown in FIG. 3(C), the TZC signal edge lies nearly at a center of the land (L) or groove (G). Consequently, the DSP core 36 counts TZC signal edges, thereby counting lands and grooves between a present position to a target position.

That is, the DSP core 36, during seek, counts down the counter 34 each time a TZC signal edge is detected. Thus, the number of the remaining edges is to be known. In step S9, it is determined whether the count value is remaining 1 or not. That is, it is determined whether an edge one before outputting a brake pulse (a 2 N−2th edge) has been counted or not. If "NO" in step S9, it is determined that a 2N−2th edge has not been counted, and the process returns to the step S9. On the other hand, if "YES" in the step S9, it is determined that a 2N−2th edge has been counted, and in step S11 it is determined whether the moving direction of the optical pickup 12 is toward the outward or not. If "NO" in the step S1, i.e. the moving direction is inward, the process advances to step S25 shown in FIG. 25.

On the other hand, if "YES" in the step S11, i.e. the moving direction is outward, it is determined in step S13 whether track jump is to a land or not. That is, it is determined whether a jumped track is at a land or not based upon whether a track of the MO disk 42 on which the optical pickup 12 before seek has read out a reproduced signal is at a land or a groove. Incidentally, the present MO disk 42 is a two-spiral-schemed disk and can allow land-to-land jump or groove-to-groove jump. If "YES" in the step S13, i.e. a land, then it is determined in step S15 whether the TZC signal is in a high level or not. If "YES" in the step S15, it is determined that edge counting is correctly done, and the process proceeds to step S17. On the other hand, if "NO" in the step S15, it is determined that edges are miscounted, and the process proceeds to step S29.

If "NO" in the step S13, i.e. a groove, it is determined in step S23 whether the TZC signal is in a high level or not. If "YES" in the step S23, it is determined that edges are correctly counted, and the process advances to step S17. On the other hand, if "NO" in the step S23, it is determined that edges are counted incorrect, and the process proceeds to step S29.

In step S17, it is determined whether the counting in the TZC signal has ended or not. That is, it is determined whether the count value of the counter 34 becomes 0 or not. If "NO" in the step S17, it is determined that the counting is not ended and the process directly returns to the step S17. However, if "YES", it is determined that the counting is ended and in step S19 a brake pulse is outputted through use of the PWM driver 38c. Subsequently, in step S21 tracking servo is turned on to thereby introduce a desired land or groove and then the process is ended.

As shown in FIG. 5, it is determined in step S25 whether a jumped-to track is at a land or not. If "NO" in step S25, i.e. at a groove, then it is determined in step S31 whether the TZC signal is in a high level or not. If "YES" in the step S31, it is determined that edge counting is correctly done and the process proceeds to step S17. On the other hand, If "NO" in the step S31, it is determined that edges are incorrectly counted and the process advances to step S29.

If "YES" in the step S25, i.e. at a land, it is determined whether the TZC signal is in a high level or not. If "YES" in step S27, it is determined that edges are miscounted and in step S29 the counter 34 is incremented. That is, the count number of edges (count value) is increased by one. Accordingly, even where the TZC signal edges are counted incorrect due to variation of the offset value, tracking on a land or groove is correctly done. Accordingly, in the event that jump is unsuccessful to a track including a target, the target position can be positively accessed.

According to this embodiment, even where the TZC signal varies in its offset value, the counter count value is corrected immediately before outputting a brake pulse, enabling jump correctly to a land or groove. This makes it possible to access a target position positively, i.e. seek is effected with stability.

A disk apparatus 10 of another embodiment is similar to the FIG. 1 embodiment excepting that, when a seek instruction is given, jump is made by previously correcting (incrementing) a count value in accordance with a moving direction of the optical pickup 12, a land and/or groove and a TZC level. Hence, duplicated explanation is omitted herein.

In this disk apparatus 10, the number of TZC signal edges to be counted (2N−1), i.e. a count value, is set to the counter 34 in a manner corresponding to the number of tracks to jump over (N). Next, tracking servo is turned off and a TZC signal is produced based on an extracted TE signal. It is herein determined similarly to the FIG. 1 embodiment whether or not there is variation in the offset value according to a direction of movement (outward/inward), a land/groove and a TZC level. Where there is variation in the TZC-signal offset value, the number of TZC-signal edges would be incorrectly counted. Accordingly, the count value is incremented. In this manner, jump is done after correcting the count value.

Figure 6:
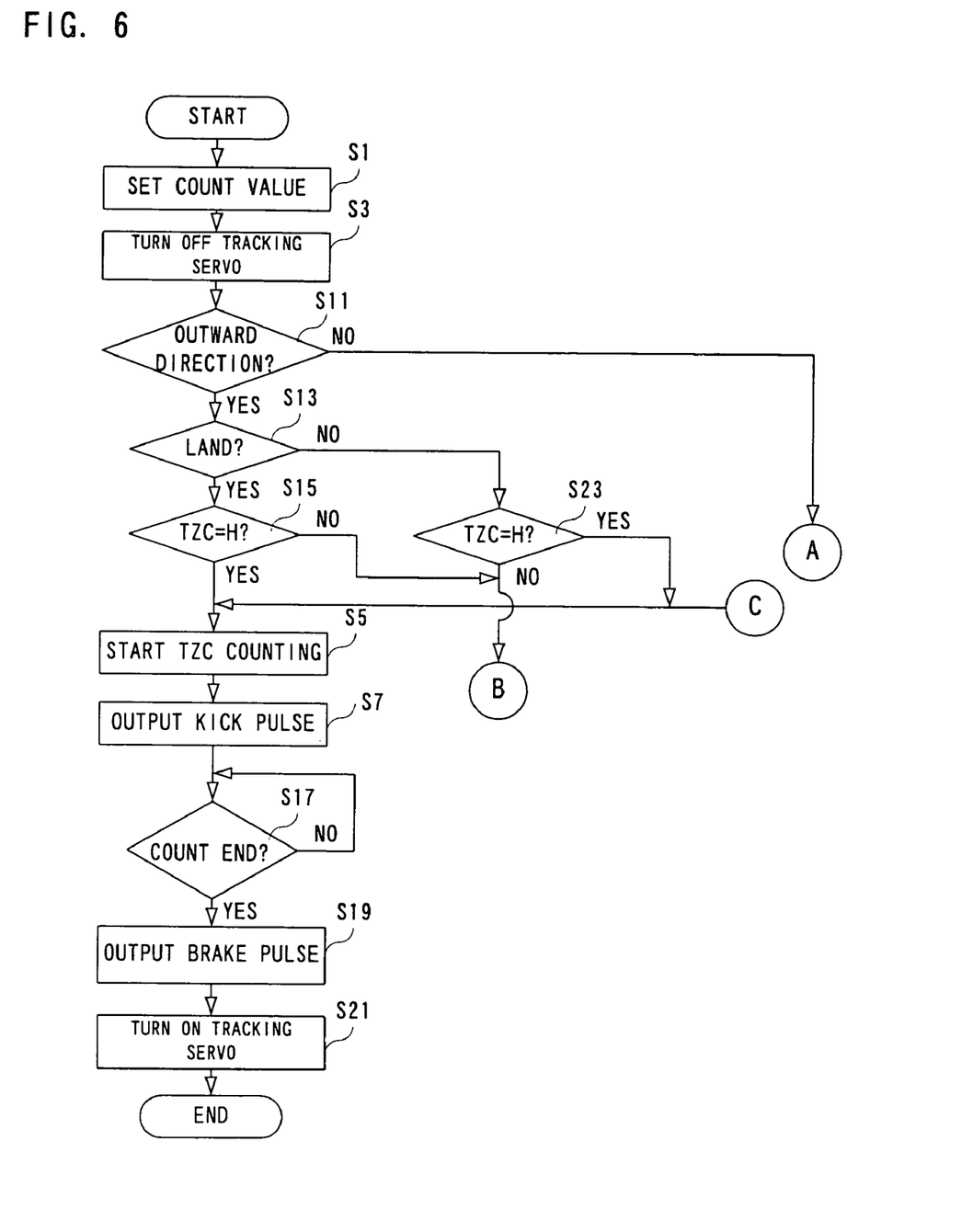
FIG. 6 is a flowchart showing one part of processing by the DSP core in another embodiment of the invention.
Figure 7:
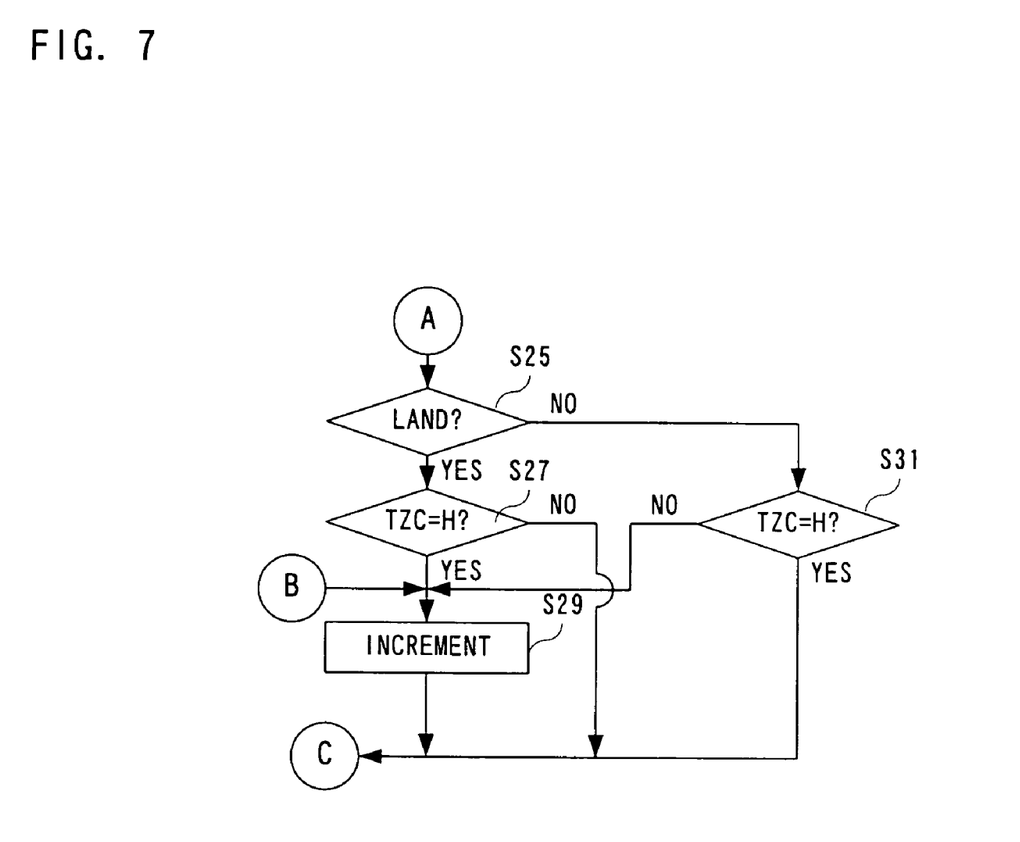
FIG. 7 is a flowchart showing another part of processing by the DSP core in the other embodiment of the invention.

That is, the processing by the DSP core 36 is different from that of the FIG. 1 embodiment. Specifically, as shown in FIG. 6 and FIG. 7, the processing of the steps S11–15 and step S23 shown in FIG. 4 and the steps S24–31 shown in FIG. 5 is executed between the steps S3 and S5. Incidentally, in the other embodiment, because the count value is corrected prior to jump, the processing of the step S9 shown in FIG. 4 is omitted away.

According to the other embodiment, even where the TZC signal varies in its offset value, the counter count value is corrected beforehand, making possible to jump correctly to a land or groove. Thus, a target position is accurately accessed, i.e. seek is done with stability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus for setting to a counter a count value corresponding to the number of tracks to jump over, subtracting the count value each time a rising or trailing edge is detected in zero-cross signal, and applying brake to finish jump when the count value reaches 0, comprising:
   direction determiner for determining in which one a pickup is to move in an outward direction or in an inward direction of a disk;
   level determiner for determining a level of the zero-cross signal prior to starting the jump or just prior to applying the brake;
   a track determiner for determining to which one jump is to be made of a land or a groove; and
   an incrementer for incrementing the count value of said counter depending upon the level of the tracking zero-cross signal determined by said level determiner and a determining result by said track determiner.

2. A disk apparatus according to claim 1, wherein, where said pickup is moving in the outward direction of said disk, said incrementer increments the count value when the land is determined and the level is in a low level, and increments the count value when the groove is determined and the level is in a high level.

3. A disk apparatus according to claim 1, wherein, where said pickup is moving in the inward direction of the disk, said incrementer increments the count value when the land is determined and the level is in a high level, and increments the count value when the groove is determined and the level is in a low level.

4. A disk apparatus according to claim 1, wherein said level determiner determines the level when the count value reaches a predetermined value.

5. A disk apparatus according to claim 1, wherein said level determiner determines the level prior to setting the count value and starting jump.

6. A disk apparatus according to claim 1, wherein where said pickup is moving in the outward direction of said disk, said incrementer increments the count value when the land is determined and the level is in a low level, and increments the count value when the groove is determined and the level is in a high level, and further wherein, where said pickup is moving in the inward direction of the disk, said incrementer increments the count value when the land is determined and the level is in a high level, and increments the count value when the groove is determined and the level is in a low level.

* * * * *